(12) United States Patent
Cheng

(10) Patent No.: US 9,972,061 B2
(45) Date of Patent: May 15, 2018

(54) METHOD AND APPARATUS FOR GENERATING ANTI-FORGERY IMAGE

(71) Applicant: Ye Cheng, Guangdong (CN)

(72) Inventor: Ye Cheng, Guangdong (CN)

( * ) Notice: Subject to any disclaimer, the term of this patent is extended or adjusted under 35 U.S.C. 154(b) by 0 days. days.

(21) Appl. No.: 15/426,469

(22) Filed: Feb. 7, 2017

(65) Prior Publication Data

US 2017/0221172 A1 Aug. 3, 2017

Related U.S. Application Data

(63) Continuation of application No. PCT/CN2016/085539, filed on Jun. 13, 2016.

(30) Foreign Application Priority Data

Feb. 2, 2016 (CN) .......................... 2016 1 0074759

(51) Int. Cl.
G06K 9/00 (2006.01)
G06T 1/00 (2006.01)
G06K 19/06 (2006.01)

(52) U.S. Cl.
CPC ...... G06T 1/0042 (2013.01); G06K 19/06103 (2013.01); G06T 1/0092 (2013.01)

(58) Field of Classification Search
CPC . G06F 21/00; G06K 19/06103; G06T 1/0021; G06T 1/0042; G06T 1/0092;
(Continued)

(56) References Cited

U.S. PATENT DOCUMENTS 9,159,016 B2 * 10/2015 Gardner ........... G06K 19/07749
9,495,605 B2 * 11/2016 Eckel ................. G07C 9/00031
(Continued)

FOREIGN PATENT DOCUMENTS

CN 1971591 A 5/2007
CN 102622626 A 8/2012
(Continued)

OTHER PUBLICATIONS

International Search Report and Written Opinion issued by Chinese Patent Office for international application PCT/CN2016/085539 dated Oct. 28, 2016.

*Primary Examiner* — Mekonen Bekele
(74) *Attorney, Agent, or Firm* — McCarter & English, LLP

(57) ABSTRACT

A method and an apparatus for generating an anti-forgery image are provided. The method includes: determining, according to a rule for setting bits, related parameters; determining a combination quantity of bits, according to the parameters; acquiring a width, height and code numeric value of the anti-forgery image to be generated and requesting a memory space for the anti-forgery image to be generated according to the width and height of the anti-forgery image to be generated; determining positions of the code points in the bits according to the parameters; determining the image cell's initial coordinate in the anti-forgery image to be generated according to a rule for setting coordinates; and drawing the image cell in the memory space according to the image cell's initial coordinate in the anti-forgery image to be generated, where the drawn image cell forms the anti-forgery image.

15 Claims, 5 Drawing Sheets

(58) Field of Classification Search
CPC ...... G09C 5/00; G06Q 90/20; G06Q 30/0261; H04W 4/021; H04W 4/043
See application file for complete search history.

(56) References Cited

U.S. PATENT DOCUMENTS

| | | | |
|---|---|---|---|
| 2008/0116276 A1* | 5/2008 | Lo | G06K 19/06018 235/462.01 |
| 2009/0284775 A1* | 11/2009 | Muramatsu | H04N 1/6033 358/1.9 |
| 2012/0024956 A1 | 2/2012 | Chen | |
| 2015/0030154 A1* | 1/2015 | Sarda | H04N 1/448 380/28 |
| 2015/0358156 A9* | 12/2015 | Sarda | H04N 1/448 380/28 |
| 2016/0055552 A1* | 2/2016 | Chai | G06Q 20/02 705/34 |

FOREIGN PATENT DOCUMENTS

| | | |
|---|---|---|
| CN | 103761798 A | 4/2014 |
| CN | 103824197 A | 5/2014 |

\* cited by examiner

US 9,972,061 B2

METHOD AND APPARATUS FOR GENERATING ANTI-FORGERY IMAGE

This application is a continuation application of International Application No. PCT/CN2016/085539, filed on Jun. 13, 2016; and claims the priority of Chinese Patent Application No 201610074759.3, entitled "Method And Apparatus For Generating Anti-Forgery Image" filed on Feb. 2, 2016, the entire contents of all of which are incorporated herein by reference.

TECHNICAL FIELD

Embodiments of the present invention relate to anti-forgery technologies, for example, relate to a method and an apparatus for generating an and-forgery image.

BACKGROUND

With the popularization of computers and improvement of security technologies, the anti-forgery technology strides forward to digitalization. The generation of digital anti-forgery products is based on a subject of anti-forgery, namely consumers. An aim of brand protection and against counterfeit can be realized only when the consumers can easily and conveniently identify genuine commodity and fake commodity. According to an existing digital anti-forgery technology, each product is pasted with an anti-forgery marker having a unique anti-forgery identification code, and all these anti-forgery identification codes are stored in a database server. After such a product being bought by a consumer, the genuineness of the code can be verified via a mobile phone or network, and the verification result can be fed back to the consumer immediately. With the popularization of two-dimensional code application, the two-dimensional code can also be printed on the product to serve as the anti-forgery identification code, and the consumers can realize information authentication by scanning the two-dimensional code.

However, the anti-forgery identification code of the related art has drawbacks such as simple, easy to steal and copy. The two-dimensional code is not encrypted during an encoding process, thus information in the two-dimensional code may be easily obtained by anybody, causing low secrecy.

SUMMARY

Embodiments of the present invention provide a method and device for generating an anti-forgery image of high secrecy.

According to a first aspect, a method for generating an anti-forgery image is provided.

The method includes:

the following parameters are determined according to a rule for setting bits: the quantity of bits in an image cell of an anti-forgery image to be generated, data point locations in the bits and the quantity thereof, data point locations, at which a code point exists, in the bits and the quantity thereof, code value bits among the bits and the quantity thereof, pseudo-random variable bits among the bits and the quantity thereof, where adjacent bits are closely arranged;

A combination quantity of each of the bits is determined according to the quantity of data point locations in the bits and the quantity of data point locations, at which a code point exists, in the bits.

A width, height and code numeric value of the anti-forgery image to be generated are acquired, where a value range of the code numeric value is determined by the combination quantity of each of the bits and the quantity of the code value bits among the bits, and a memory space is requested for the anti-forgery image to be generated based on the width and height of the anti-forgery image to be generated.

The positions of code points in the bits are determined based on the code numeric value, the combination quantity of each of the bits, the quantity of the code value bits among the bits and the quantity of the pseudo-random variable bits among the bits.

An initial coordinate of the image cell in the anti-forgery image to be generated is determined according to a rule for setting coordinate.

The image cell is drawn in the memory space according to the image cell's initial coordinate in the anti-forgery image, where the drawn image cell forms the anti-forgery image.

According to a second aspect, a device for generating anti-forgery image is provided. The device includes:

a setting module, configured to determine according to a rule for setting bits, the quantity of bits in an image cell of an anti-forgery image to be generated, data point locations in the bits and the quantity thereof, data point locations, at which a code point exists, in the bits and the quantity thereof, code value bits among the bits and the quantity thereof, and pseudo-random variable bits among the bits and the quantity thereof, wherein adjacent bits are closely arranged;

a combination quantity calculation module, configured to determine a combination quantity of each of the bits, according to the quantity of data point locations of the bits and the quantity of data point locations, at which a code point exists, in the bits;

a parameter acquisition module, configured to acquire a width, height and code numeric value of the anti-forgery image to be generated, wherein a value range of the code numeric value is determined by the combination quantity of each of the bits, and applying for a memory space for the anti-forgery image to be generated according to the width and height of the anti-forgery image to be generated;

a code point determination module, configured to determine positions of the code points in the bits according to the code numeric value, the combination quantity of each of the bits, the quantity of the code value bit among the bits and the quantity of the pseudo-random variable bit among the bits;

a coordinate determination module, configured to determine an initial coordinate, in the anti-forgery image to be generated, of the image cell according to a rule for setting coordinate; and an image drawing module, configured to draw the image cell in the memory space according to the initial coordinate of the image cell in the anti-forgery image to he generated, wherein the anti-forgery image composes of the drawn image cell.

According to a third aspect, a computer readable storage medium storing computer executable instructions is provided. When the computer executable instructions are executed by an electronic device, the electronic device is caused to perform the above method.

According to the present disclosure, with respect to the generation of an anti-forgery image, a plurality of parameters are set, so that one or more of the plurality of parameters can be modified to generate anti-forgery images for a second user after generating a batch of anti-forgery images of same parameters for a first user. As a result, even if the first user is aware of the method for generating the anti-forgery image, the first user cannot crack the anti-forgery images of the second user because he/she does not know the parameters set by the second user, thereby improving the secure of the anti-forgery image

DETAILED DESCRIPTION

The disclosure will be further described in detail below in conjunction with accompanying drawings and embodiments. It should be noted that the specific embodiments disclosed herein are not intended for limiting the disclosure.

First Embodiment

Figure 1:
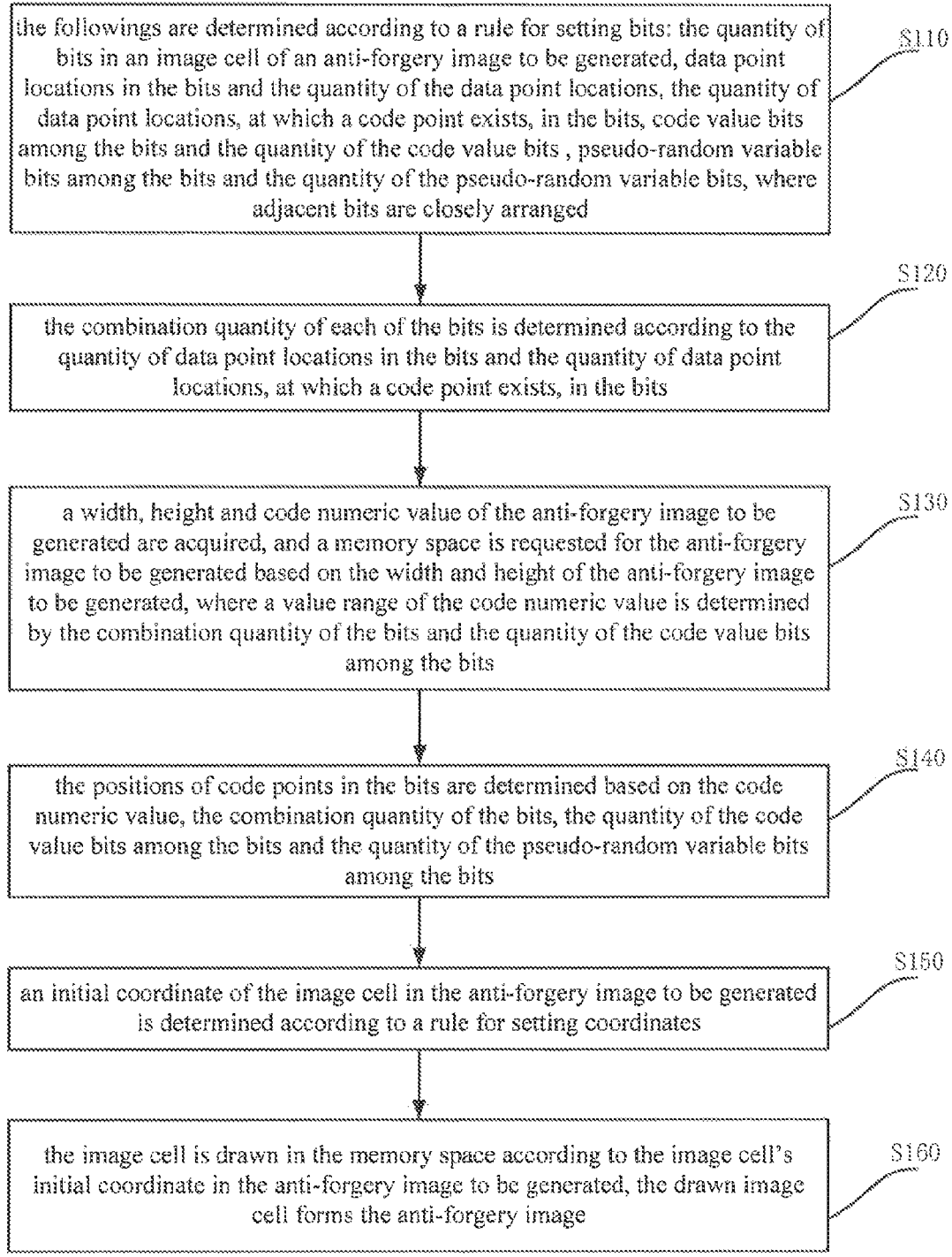
FIG. 1 is a flow chart of a method for generating an anti-forgery image according to a first embodiment of the present invention.

FIG. 1 is a flow chart of a method for generating an anti-forgery image according to the first embodiment of the present invention. The method of the present embodiment is applicable to the generation of the anti-forgery image, and can be performed by an apparatus for generating an anti-forgery image. The apparatus can be implemented by software and/or hardware. The method includes the steps described below.

In step S110, the followings are determined according to a rule for setting bits: the quantity of bits in an image cell of an anti-forgery image to be generated, data point locations in the bits and the quantity of the data point locations, the quantity of data point locations, at which a code point exists, in the bits, code value bits among the bits and the quantity of the code value bits, pseudo-random variable bits among the bits and the quantity of the pseudo-random variable bits, where adjacent bits are closely arranged.

Data point locations are a plurality of position areas in the bits, also are basic units that constitute a bit. A bit includes one or more data point locations. The bit is a basic unit of an image cell. An image cell includes one or more bits. The image cell is a basic unit of an anti-forgery image. The area of image cell is fixed. The anti-forgery image is an image used for digital anti-forgery of a product, and is composed of one or more image cells. A code value bit is a bit that represents a code value. The number of code value bits may be one or more. A pseudo-random variable bit is a bit for representing a pseudo-random variable. The number of pseudo-random variable bits also may be one or more. The pseudo-random variable is a variable that enables the anti-forgery image to have a pseudo-random visual effect. The code value is an acquired code numeric value. Each code numeric value corresponds to a unique anti-forgery image. Optionally, a code point may be provided at a data point location. The code point may be a black code point or grey level code point, other than black, of at least one grey level value. For example, the code point may be a white code point or a grey code point of any grey level value in a range of 1-254, so that the information capacity of the anti-forgery image is increased. The bit includes one or more data point locations. Optionally, the bit includes 7 data point locations. The shape of the bit may be a square or a polygon. Optionally, the shape of the bit is a hexagon so as to increase the visual randomness of the anti-forgery image. The precision of the bit can be very high, which may be optionally 600 pixel dots per inch, so that the anti-forgery image is hard to duplicate and the secrecy of the anti-forgery image is further improved. The bit may further include positioning code points, the number of which is at least 3. The positioning code points may be distributed in different bits and are used for positioning the anti-forgery image. For example, one image cell includes seven hexagonal bits, each of which includes seven data point locations. The code points at three data point locations in the first one of the seven hexagonal bits are used for positioning, one black code point and three white code points exist at the other four data point locations in the first one of the seven hexagonal bits. The seven data point locations of each of the other six bits includes two black code points and five white code points. The first bit and two of the other six bits are pseudo-random variable bits for representing pseudorandom variables. The remaining four bits of the other six bits are served as code value bits for representing code values.

Optionally, the rule for setting bits is not fixed, and may be set by manufactures or users. If the rule for setting bits is changed, the following parameters will be changed accordingly: the quantity of bits in an image cell of an anti-forgery image to be generated, data point locations in the bits and the quantity thereof, the quantity of data point locations, at which the code point exists, in the bits, the code value bits among the bits and the quantity thereof, the pseudo-random variable bits among the bits and the quantity thereof. The change of the parameters will change a combination quantity of each of the bits, thereby causing a change of the anti-forgery image generated.

In step S120, the combination quantity of each of the bits is determined according to the quantity of data point locations in the bits and the quantity of data point locations, at which a code point exists, in the bits.

The combination quantity of each of the bits is the number of the bit's possible values, and includes the combination quantity of code value bit and the combination quantity of pseudo-random variable bit. The combination quantity of a bit is the number of different combinations of data point locations and code points. For example, still taking an image cell including seven hexagonal bits and each bit including seven data point locations as an example, within the first bit, code points at three data point locations are used for positioning, and there exists one black code point and three white code points at the other four data point locations. The positioning code points are fixed, so there are tour different combinations of the arrangement of the code points of the first bit. That is, the first bit has four possible values, so the combination quantity of the first bit is four. The seven data point locations of each of the other six bits include two black code points and five white code points. Arrangements for code points in each of the other six bits may have 21 different combinations, calculated according to combinatorial math formulas code point, as a result, the combination quantity of each of the other six bits is 2.1. Since the first bit and two of the other six bits are pseudorandom variable bits, the combinatorial quantities of current three pseudo-random variable bits are 4, 21 and 21, respectively. The combination quantity of the remaining four code value bits among the other six bits are 21, 21, 21 and 21, respectively.

In S130, a width, height and code numeric value of the anti-forgery image to be generated are acquired, and a memory space is requested for the anti-forgery image to be generated based on the width and height of the anti-forgery image to be generated, where a value range of the code numeric value is determined by the combination quantity of the bits and the quantity of the code value bits among the bits.

Optionally, the calculation of the code numeric value may be a product of the combination quantities of the code value bits among the image cell. For example, if there are four code value bits and the combination quantity of each of the four code value bits is 21, the product of the combination quantity of each code value bit among the combination quantities of the bits is 21*21*21*21=194481, and the code numeric value may be any value within 1 to 194481 or 0 to 194480.

The width, height and code numeric value of the anti-forgery image can be obtained by acquiring setting parameters of a user via a client.

In S140, the positions of code points in the bits are determined based on the code numeric value, the combination quantity of the bits, the quantity of the code value bits among the bits and the quantity of the pseudo-random variable bits among the bits.

The position of a code point in the bits is a specific data point location at which the code point exists. The position of a code point in the bits can be calculated according to the code numeric value, the combination quantity of the bit, the quantity of the code value bits among the bits and the quantity of the pseudo-random variable bits among the bits, and determined by combining a preset mapping relationship of the code points in the bits.

In S150, an initial coordinate of the image cell in the anti-forgery image to be generated is determined according to a rule for setting coordinates.

Optionally, the rule for setting coordinates may define a specific coordinate setting rule, each image cell's initial coordinate of in the anti-forgery image to be generated can be determined according to the rule for setting coordinates.

The image cell's initial coordinate is the coordinate of an upper left vertex of the image cell when the image cell is in the anti-forgery image. The process of determining the image cell's initial coordinate in the anti-forgery image to be generated may be: taking the coordinate of the origin of the anti-forgery image to he generated as the initial coordinate of a first image cell; and calculating the initial coordinate, in the anti-forgery image to be generated, of each of image cells other than the first image cell according to surrounding image cells the initial coordinates of which are known. The coordinate of the origin of the anti-forgery image is the coordinate of the upper left vertex of the anti-forgery image.

The image cells' initial coordinates may be determined line by line. The coordinate of the origin of the anti-forgery image to be generated is taken as the initial coordinate of the first image cell in the first row; then the initial coordinate of the second image cell in the first row is determined. Optionally, the initial coordinates, in the anti-forgery image to be generated, of the image cells other than the first image cell may be obtained by calculating according to surrounding image cells the initial coordinates of which are known and the specific sizes and shapes of the image cells. The coordinate of the origin of the anti-forgery image is the coordinate of the upper left vertex of the anti-forgery image. The image cells are distributed in lines in the anti-forgery image, the lines herein may be parallel to the width direction or the height direction of the anti-forgery image, or may be not parallel to the width direction or the height direction of the anti-forgery image. Optionally, the lines are not parallel to the width direction or the height direction of the anti-forgery image, the secrecy of this arrangement is higher.

In S160, the image cell is drawn in the memory space according to the image cell's initial coordinate in the anti-forgery image to be generated, the drawn image cell forms the anti-forgery image.

According to the initial coordinates, in the anti-forgery image to be generated, of the image cells, the image cells may be drawn one by one, or all the image cells in the anti-forgery image may be drawn simultaneously.

Optionally, the image cells may be drawn one by one in an obliquely up direction beginning from the upper left vertex of the anti-forgery image.

According to the technical solution of the embodiment, a plurality of parameters are set for the generation of the anti-forgery image according to the preset bit rule. Therefore, after generating a plurality of anti-forgery images for the first user, the preset bit rule is changed and settings of one or more of the plurality of parameters are changed, so as to generate anti-forgery images for the second user. As a result, even if the first user is aware of the method for generating the anti-forgery image, the first user cannot crack the anti-forgery images of the second user because he/she does not know the bit rule and the parameters set by the second user, thereby improving the secure of the anti-forgery image.

Second Embodiment

Figure 2:
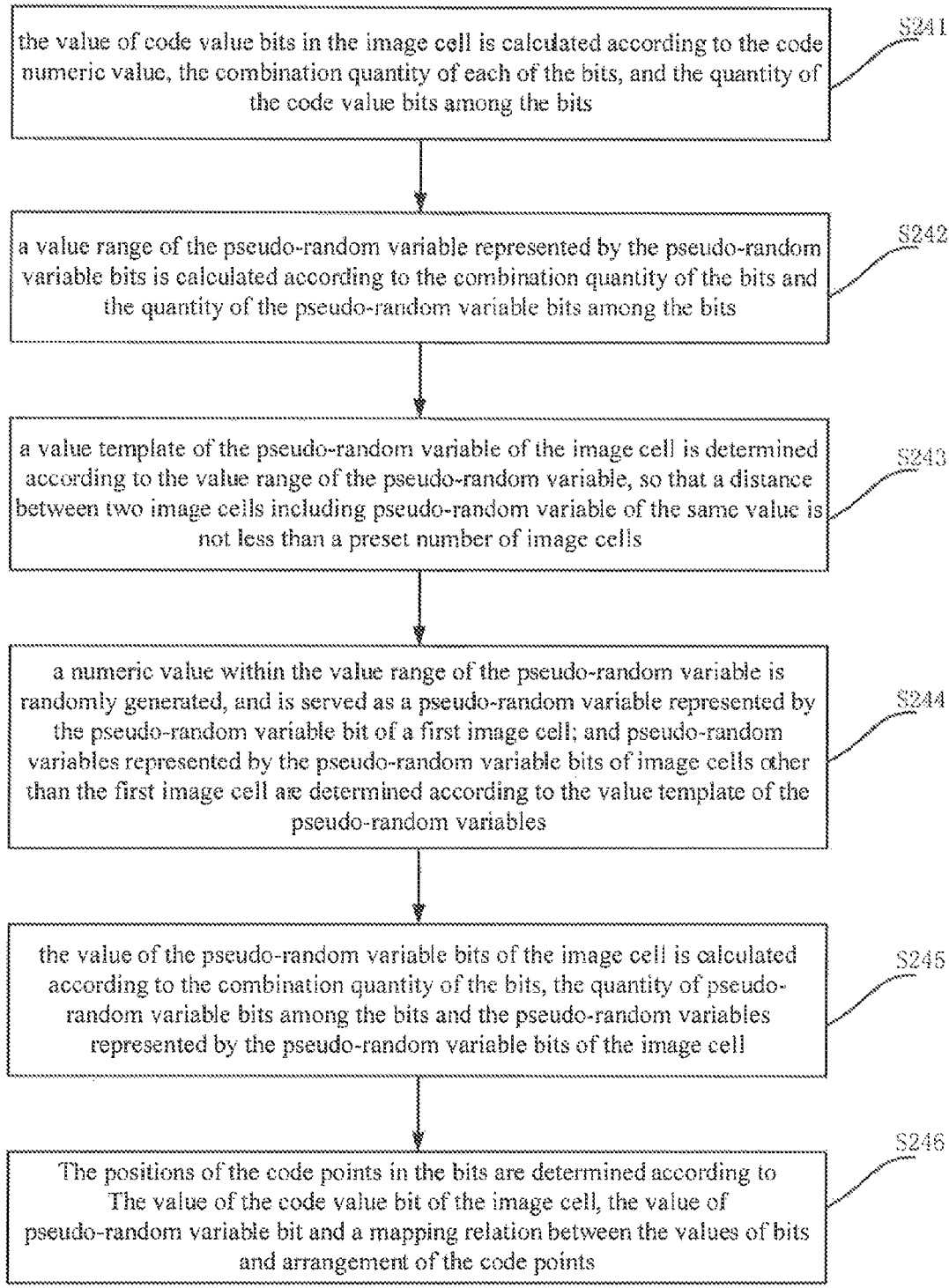
FIG. 2 is a flow chart of determining positions of code points in the bits of a method for generating an anti-forgery image according to a second embodiment of the present invention.

FIG. 2 is a flow chart of determining positions of code points in the bits of a method for generating an anti-forgery image according to the second embodiment of the present invention. The step S140 is further optimized on the basis of the first embodiment in the method of the present embodiment. Optionally, step S140 of the present method includes the steps described below.

In S241, the value of code value bits in the image cell is calculated according to the code numeric value, the combination quantity of each of the bits, and the quantity of the code value bits among the bits.

The combination quantity of the bit may include: the combination quantity of pseudo-random variable bit and the combination quantity of code value bit. The process of calculating the value of code value bit in the image cell may be: calculating an initial value of the code value bit in the image cell according to the code numeric value, the combination quantity of the bit, and the quantity of code value bits among the bits; and encrypting the initial value of the code value bits with an encryption algorithm to obtain the value of code value bits.

Optionally, the process of calculating the initial value of code value bits in the image cell may be: dividing the code numeric value by a product of combination quantities of code value bits other than the first code value bit to obtain a quotient and a remainder; taking the obtained quotient as the initial value of the first code value bit; dividing the obtained remainder by a product of combination quantities of code value bits other than the first and second code value bits, so as to obtain a quotient and take the quotient as the initial value of the second code value bit; and so on, calculating the initial value of each code value bit in the current image cell, For example, still taking the image cell including seven hexagonal bits as an example, the inputted code numeric value is divided by (21*21*21) to obtain a quotient, which is taken as the initial value of the first code value bit, and a remainder b1. Then, b1 is divided by (21*21) to obtain a quotient, which is taken as the initial value of the second code value bit, and a remainder b2. Finally, b2 is divided by 21 to obtain a quotient, which is taken as the initial value of the third code value bit, and a remainder b3, which is taken as the initial value of the fourth code value bit.

In S242, a value range of the pseudo-random variable represented by the pseudo-random variable bits is calculated according to the combination quantity of the bits and the quantity of the pseudo-random variable bits among the bits.

The value range of the pseudo-random variable is a value scope of the pseudo-random variables in the current image cell, and is obtained by calculating a product of combination quantities of the pseudo-random variable bits among the combination quantities of all the bits in the current image cell. For example, assuming that there are three pseudo-random variable bits, the combination quantities of which are 4, 5 and 6 respectively, in the current image cell, the product of 4*5*6 is 120. Consequently, the value range of the pseudo-random variables in the current image cell is 0-199.

In S243, a value template of the pseudo-random variable of the image cell is determined according to the value range of the pseudo-random variable, so that a distance between two image cells including pseudo-random variable of the same value is not less than a preset number of image cells.

The preset number may be one or more. The purpose is that two image cells including the pseudo-random variables of the same value are separated by a relative long distance. As a result, the repetitiveness of the image cells is reduced, and hence the secrecy of the anti-forgery image is further improved.

In S244, a numeric value within the value range of the pseudo-random variable is randomly generated, and is served as a pseudo-random variable represented by the pseudo-random variable bit of a first image cell; and pseudo-random variables represented by the pseudo-random variable bits of image cells other than the first image cell are determined according to the value template of the pseudo-random variables.

Figure 3:
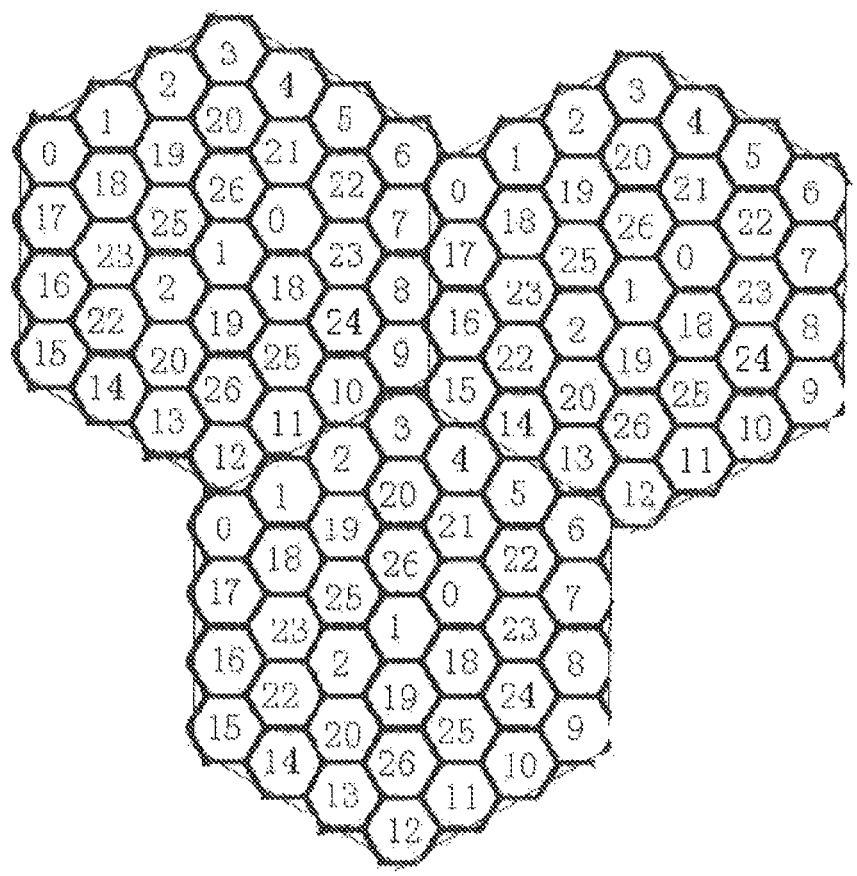
FIG. 3 is a schematic diagram of a value template of a pseudo-random variable according to the second embodiment of the present invention.

For example, FIG. 3 is a schematic diagram of a value template of pseudo-random variables. The value range of the pseudo-random variables is 0-26. When the value randomly generated for the pseudo-random variable of the first image cell is 0, the value of the pseudo-random variable of an image cell that is connected with the first image cell at the upper right side of the first image cell is 1, and the value of the pseudo-random variable of an image cell that is connected with the first image cell under the first image cell is 17, and so on, the pseudo-random variables of other image cells in the anti-forgery image are calculated. When the value randomly generated for the pseudo-random variable of the first image cell is 19, there are a plurality of 19s among the value template of the pseudo-random variable, scanning line by line from the upper left of the value template of the pseudo-random variable in the oblique upper right direction, the first found 19 prevails, the value of the pseudo-random variable of the image cell connected with the first image cell at the upper right side of the first image cell is 20, the value of the pseudo-random variable of the image cell connected with the first image cell under the first image cell is 25, the pseudo-random variables of other image cells in the anti-forgery images are calculated by analogy. When the value randomly generated for the pseudo-random variable of the first image cell is 3, at this time, it is found by scanning the value template that there is no image cell connected at the upper right side of an image cell the pseudo-random variable value of which is 3. Then, progressive scanning is continued on the value template until there is an image cell connected at the upper right side of an image cell the pseudo-random variable value of which is 3. As shown in FIG. 3, the pseudo-random variable 15 of the image cell is taken as the pseudo-random variable of the image cell that is connected at the upper right side of the first image cell, then the value of the pseudo-random variable of the image cell that is connected under the first image cell is 20, the pseudo-random variables of other image cells in the anti-forgery images are calculated by analogy.

In S245, the value of the pseudo-random variable bits of the image cell is calculated according to the combination quantity of the bits, the quantity of pseudo-random variable bits among the bits and the pseudo-random variables represented by the pseudo-random variable bits of the image cell.

The value of the pseudo-random variable bits is divided by a product of other combination quantities representing pseudo-random variable bits other than the first pseudo-random variable bit to obtain a quotient, which is taken as the value of the first pseudo-random variable bit, and a remainder. The remainder is divided by a product of other combination quantities representing pseudo-random variable bits other than the first and second pseudo-random variable bits to obtain a quotient, which is taken as the value of the second pseudo-random variable bit, the value of each pseudo-random variable bit in the image cell is calculated by analogy.

Optionally, the process of calculating the value of pseudo-random variable bit in the image cell may be: generating a check value for the code numeric value according to a check algorithm; joining the check value and the pseudo-random variable represented by the pseudo-random variable bit of the image cell to obtain a joined value; and calculating the value of the pseudo-random variable bit of the image cell according to the combination quantity of the bits, the quantity of pseudo-random variable bits among the bits and the joined value. The correctness of the decoding result can be ensured by adding the check value.

The process of calculating the value of pseudo-random variable bits in the image cell may be: generating a check value for the code numeric value according to a check algorithm; joining the check value and the pseudo-random variable represented by the pseudo-random variable bit of the image cell to obtain a joined value; dividing the joined value by a product of combination quantities representing pseudo-random variable bits other than the first pseudo-random variable bit to obtain a quotient, which is taken as the initial value of the first pseudo-random variable bit, and a remainder; dividing the remainder by a product of combination quantities representing pseudo-random variable bits other than the first and second pseudo-random variable bits to obtain a quotient, which is taken as the initial value of the second pseudo-random variable bit, and calculating the initial value of each pseudo-random variable bit in the image cell by analogy.

For example, still taking an image cell including seven hexagonal bits as an example, since a preset check value is 6 bits, the pseudo-random variable is shifted to the left by 6 bits, then the check value is joined into the last 6 bits of the pseudo-random variable to generate the joined value. The joined value is divided by (21*4) to obtain a quotient, which is taken as the initial value of the first pseudo-random variable bit, and remainder b4, then b4 is divided by 4 to obtain a quotient, which is taken as the initial value of the second pseudorandom variable bit, and a remainder b5, which is taken as the initial value of the third pseudo-random variable bit.

In S246, the positions of the code points in the bits are determined according to the value of the code value bit of the image cell, the value of pseudo-random variable bit and a mapping relation between the values of bits and arrangement of the code points.

The value of the bit is a specific numeric value. The arrangement of code points is a distribution of code points over data point locations in the bit. A mapping relationship of the value of the bit and the arrangement of code points is a relationship after the value of the bit and the arrangement of code points being associated. For example, the mapping relationship of the value of the bit and the arrangement of code points may be as follows: when the value of a bit is 1, among seven corresponding code points in the bit, the black code point is located at the data point location in the center, the other six white code points are disposed at six data point locations uniformly distributed around the center.

According to the technical solution of the present embodiment, with the application of the value template of the pseudo-random variable, the repetitiveness of pseudo-random variables determined by the value template of the pseudo-random variable is low, so that the regularity of the generated anti-forgery image is not obvious, thereby improving the secrecy of the anti-forgery image.

Third Embodiment

A method for generating an anti-forgery image is provided by the third embodiment. The present embodiment is an alternative solution proposed on the basis of the above embodiments. The method includes the steps described below.

The following parameters are determined according to a rule for setting bits: the quantity of bits in an image cell of an anti-forgery image to be generated, data point locations in the bits and the quantity thereof, the quantity of data point locations, at which a code point exists, in the bits, code value bits among the bits and the quantity thereof, and pseudo-random variable bits among the bits and the quantity thereof, where adjacent bits are closely arranged.

A combination quantity of the bit is determined, according to the quantity of data point locations of the bits and the quantity of data point locations, at which a code point exists, in the bit. The combination quantity of the bit includes a combination quantity of code value bits and a combination quantity of pseudo-random variable bits.

A value range of the code value and a value range of the pseudo-random variable are calculated, respectively, according to the combination quantity of code value bits and the combination quantity of pseudo-random variable bits among the combination quantity of the bit. Further, a value template of the pseudo-random variable of the image cell is determined according to the value range of the pseudo-random variable, so that a distance between two image cells including the pseudo-random variables of the same value is not less than a preset number of image cells.

The user is prompted to determine a numeric value within the value range of the code value according to the value range of the code value to serve as a code numeric value. Further, a width, height and the code numeric value, inputted by the user, of the anti-forgery image to be generated are acquired, then a memory space is requested for the anti-forgery image to be generated according to the width, height of the anti-forgery image to be generated. Finally, the code numeric value is processed with a check algorithm so as to obtain a check value.

The code numeric value is divided by a product of combination quantities representing other code value bits other than the first code value bit to obtain a quotient, which is taken as the initial value of the first code value bit, and a remainder; the remainder is divided by a product of combination quantities representing code value bits other than the first and second code value bits to obtain a quotient, which is taken as the initial value of the second code value bit. The initial value of each code value bit in the current image cell is calculated by analogy.

If the current image cell is the first image cell, a numeric value is randomly generated within the value range of the pseudo-random variable, and the numeric value is :taken as the pseudo-random variable represented by the pseudo-random variable bit of the first image cell. If the current image cell is not the first image cell, the pseudo-random variable represented by the pseudo-random variable bit of the current image cell is determined according to the value template of the pseudo-random variable.

The check value and the pseudo-random variable represented by the pseudo-random variable bit of the image cell are joined to obtain a joined value. The joined value is divided by a product of combination quantities representing pseudo-random variable bits other than the first pseudo-random variable bit to obtain a quotient, which is taken as the initial value of the first pseudo-random variable bit, and a remainder. The obtained remainder is divided by a product of combination quantities representing pseudo-random variable bits other than the first and second pseudo-random variable bits to obtain a quotient, which is taken as the initial value of the second pseudo-random variable bit. The initial value of each pseudo-random variable bit in the current image cell is calculated by analogy.

The calculated initial values of each of the pseudo-random variable bits and code value bits of the current image cell are encrypted with an encryption algorithm, so as to obtain encrypted values of the pseudo-random variable bits and code value bits.

The positions of code points of the bits in the current image cell are determined according to a mapping relationship of arrangement of the code points and the encrypted values of the pseudo-random variable bits and code value bits, where the bits in the current image cell are consisted of the code value bits and the pseudo-random variable bits.

If the current image cell is the first image cell, the coordinate of the origin of the anti-forgery image to be generated is taken as the initial coordinate of the current image cell. If the current image cell is not the first image cell, the Current image cell's initial coordinate in the anti-forgery image to be generated is calculated according to the surrounding image cells the initial coordinates of which are known.

The current image cell is drawn according to the positions of code points of the bits in the current image cell and the current image cell's initial coordinate in the anti-forgery image to be generated. It is determined whether all pixels other than the first image cell in the current row are outside the anti-forgery image. If it is determined that all pixels other than the first image cell in the current row are outside the anti-forgery image, it indicates that the current row is completed drawn and it is necessary to switch to a next row. Otherwise, the image cell is proceeded to be drawn in the current row. When all the image cells in the current row are outside the anti-forgery image area, indicating that the drawing of the whole anti-forgery image is completed.

According to the present embodiment, the code numeric value is checked with the check algorithm, and the calculated initial value of the bit is encrypted, thereby the secrecy of the anti-forgery image is further improved.

Fourth Embodiment

Figure 4:
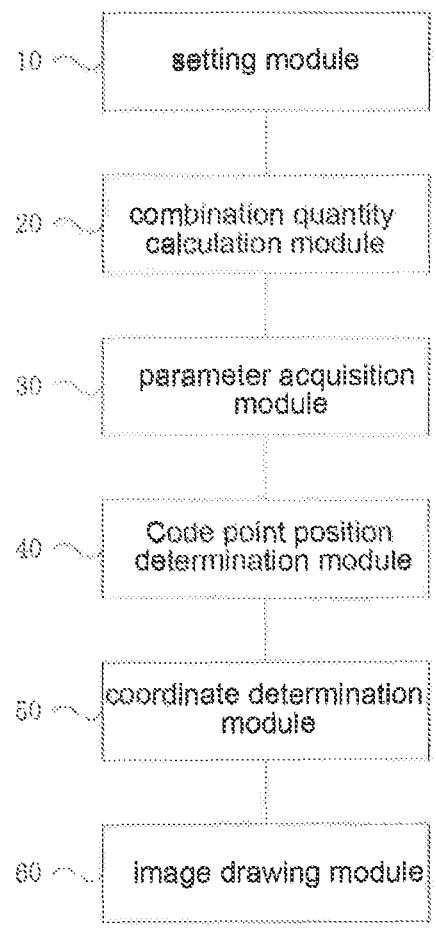
FIG. 4 is a schematic structural diagram of an apparatus for generating an anti-forgery image according to a fourth embodiment of the present invention.

FIG. 4 is a schematic structural diagram of an apparatus for generating an anti-forgery image according to the fourth embodiment of the present invention. In the present embodiment, the apparatus for generating an anti-forgery image is provided on the basis of the above embodiments. The apparatus includes: a setting module 10, a combination quantity calculation module 20, a parameter acquisition module 30, a code point position determination module 40, a coordinate determination module 50 and an image drawing module 60.

The setting module 10 is configured to, according to a rule for setting bits, determine the quantity of bits in an image cell of an anti-forgery image to be generated, data point locations in the bits and the quantity thereof, the quantity of data point locations, at which a code point exists, in the bits, code value bits among the bits and the quantity thereof, and pseudo-random variable bits among the bits and the quantity thereof, where adjacent bits are closely arranged. The combination quantity calculation module 20 is configured to determine a combination quantity of the bit, according to the quantity of data point locations of the bit and the quantity of data point locations, at which a code point exists, in the bit. The parameter acquisition module 30 is configured to acquire code numeric value and a width, height of the anti-forgery image to be generated, and request a memory space for the anti-forgery image to be generated according to the width and height of the anti-forgery image to be generated, where a value range of the code numeric value is determined by the combination quantity of the bits and the quantity of code value bits among the bits. The code point position determination module 40 is configured to determine positions of code points in the bit according to the code numeric value, the combination quantity of the bits, the quantity of code value bits among the bits and the quantity of pseudo-random variable bits among the bits. The coordinate determination module 50 is configured to determine the image cell's initial coordinate in the anti-forgery image to be generated according to a rule for setting coordinates. The image drawing module 60 is configured to draw the image cell in the memory space according to the image cell's initial coordinate in the anti-forgery image to be generated. The drawn image cells form the anti-forgery image.

According to the technical solution of the present embodiment, a plurality of parameters is set for the generation of the anti-forgery image. Therefore, after generating a batch of anti-forgery images having same parameters fir a first user, one or more of the plurality of parameters may be changed to generate anti-forgery images for a second user. As a result, even if the first user is aware of the method for generating the anti-forgery image, the first user cannot crack the anti-forgery images of the second user because he/she does not know the parameters set by the second user, thereby improving the secure of the anti-forgery image.

Optionally, the code point position determination module 40 may include: a code value bit calculation unit, a value range calculation unit, a value template setting unit, a pseudo-random variable determination unit, a pseudo-random variable calculation unit and a code point position determination unit.

The code value bit calculation unit is configured to calculate a value of the code value bits in the image cell according to the code numeric value, the combination quantity of the bits, and the quantity of the code value bits among the bits. The value range calculation unit is configured to calculate a value range of a pseudo-random variable represented by the pseudo-random variable bits according to the combination quantity of the bits and the quantity of the pseudo-random variable bits among the bits. The value template setting unit is configured to determine a value template of the pseudo-random variable of the image cell according to the value range of the pseudo-random variable, so that a distance between two image cells including pseudo-random variables of the same value is not less than a preset number of image cells. The pseudo-random variable determination unit is configured to: randomly generate a numeric value within the value range of the pseudo-random variable, which is served as a pseudo-random variable represented by the pseudo-random variable bit of a first image cell; and determine, according to the value template of the pseudo-random variable, pseudo-random variable represented by the pseudo-random variable bit of image cells other than the first image cell. The pseudo-random variable calculation unit is configured to calculate the value of the pseudo-random variable bit of the image cell according to the combination quantity of the bits, the quantity of pseudo-random variable bits among the bits and the pseudo-random variable represented by the pseudo-random variable bits of image cells. The code point position determination unit is configured to determine the positions of the code points in the bits according to the value of the code value bit of the image cell, the value of pseudo-random variable bit and a mapping relation between the values of bits and arrangement of the code points.

Optionally, the code value bit calculation unit may include an initial value calculator and an encryption device.

The initial value calculator is configured to calculate an initial value of the code value bit in the image cell according to the code numeric value, the combination quantity of the bits and the quantity of the code value bits among the bits. The encryption device is configured to encrypt the initial value of the code value bit with an encryption algorithm to obtain the value of the code value bit, Optionally, the pseudo-random variable calculation unit may include a checker, a joining device and a pseudorandom variable bit calculator.

The checker is configured to generate a check value of the code numeric value with a check algorithm. The joining device is configured to join the check value and the pseudo-random variable represented by the pseudorandom variable bit of the image cell to obtain a joined value. The pseudo-random variable bit calculator is configured to calculate the value of the pseudo-random variable bit in the image cell according to the combination quantity of the bits, the quantity of pseudo-random variable bits among the bits and the joined value.

Optionally, the coordinate determination module 50 may include: an initial coordinate determination unit and an initial coordinate calculation unit.

The initial coordinate determination unit is configured to take a coordinate Of an origin of the anti-forgery image to be generated as an initial coordinate of the first image cell. The initial coordinate calculation unit is configured to calculate initial coordinates of image cells other than the first image cell in the anti-forgery image to be generated according to surrounding image cells initial coordinates of which are known.

Optionally, the shape of the bit is a hexagon.

Optionally, the precision of the bit maybe 600 pixel dots per inch.

Optionally, the code points may include a black code point or a grey level code point of at least one grey level value other than black.

The above product can perform the method provided by any embodiment of the present invention.

An embodiment of the present disclosure further provides a storage medium storing computer executable instructions, which are configured to perform any of the above methods for generating an anti-forgery image.

Based on the aforementioned description about the embodiments, those skilled in the art can clearly understand the present disclosure may be realized by software and necessary general hardware, certainly, or also may be realized by hardware. Based on such understanding, the technical solutions of the embodiments of the present invention can be embodied in the form of a software product, which can be stored in a computer readable storage medium such as a floppy disk of a computer, a Read-Only Memory (ROM), a random access memory (RAM), a flash memory (FLASH), a hard disk, an optical disk, and the like, and includes instructions for causing a computer device (which may be a personal computer, server, network device, etc) to perform the method of embodiments of the present invention.

It is to be noted that in the embodiment of the apparatus for generating an anti-forgery image, the included units and modules are divided according to functional logic, but is not limited to the division as described above, as long as corresponding functions can be realized. The names of these function units are merely for convenience and do not limit the scope of protection of the present disclosure.

Figure 5:
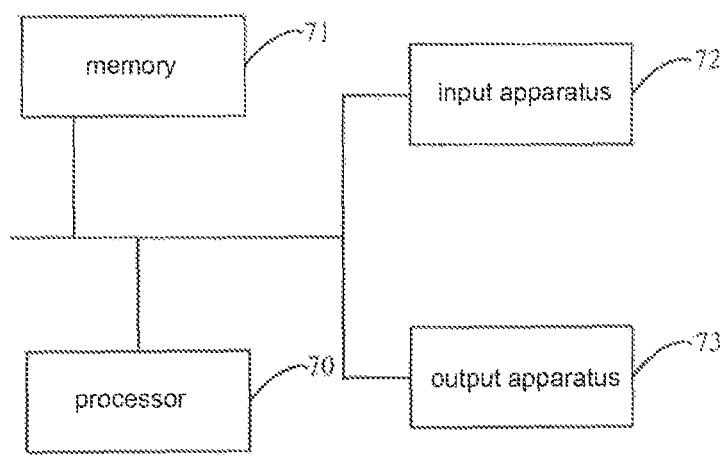
FIG. 5 is a schematic hardware structural diagram of a device according to the fourth embodiment of the present invention.

An embodiment of the present invention further provides a schematic hardware structural diagram of a device for performing the method for generating an anti-forgery image. Referring to FIG. 5, the device includes: one or more processors 70, one processor 70 is illustrated in FIG. 5 as an example; and a memory 71.

The device may further include: an input apparatus 72 and an output apparatus 73. The processor 70, the memory 71, the input apparatus 72 and the output apparatus 73 in the device may be connected by a bus or by any other means, and a bus connection is illustrated in FIG. 5 as an example.

The memory 71 is a computer readable storage medium, and may be used to store a software program, a computer executable program, such as program instructions/modules corresponding to the method for venerating an anti-forgery image in the embodiments of the present disclosure. The processor 70 executes functional applications of a server and data processing by running the software program, instructions and modules which are stored in the memory 71, that is, achieving the method for generating an anti-forgery image provided by the above method embodiments.

The memory 71 may include a program storage area and a data storage area. The program storage area may store an operating system, and applications required by at least one function. The data storage area may store data created according to the use of a terminal device and the like. In addition, the memory 71 may include a high-speed random access memory, and may further include a non-transitory memory, for example, at least one magnetic disk memory device, a flash device, or other nonvolatile solid-state memory devices. In some embodiments, the memory 71 may include memories remotely disposed relative to the processor 70, and these remotely disposed memories can be connected to the terminal device via a network. The network includes but not limited to the Internet, an intranet, a local area network (LAN), a mobile communication network and combinations thereof.

The input apparatus 72 is configured to receive input number or character information, and generate a key signal input related to user settings and function control of the terminal device. The output apparatus 73 may include display devices such as a display screen, The one or more modules are stored in the memory 71, and may be used to perform any of the above method for generating an anti-forgery image when being executed by the one or more processors 70.

The above embodiments are merely optional embodiments of the present disclosure, rather than limiting the scope of protection of the present disclosure.

What is claimed is:

1. A method for generating an anti-forgery image, comprising:
    determining, according to a rule for setting bits, a quantity of bits in an image cell of an anti-forgery image to be generated, data point locations in the bits and a quantity of the data point locations, a quantity of data point locations, at which a code point exists, in the bits, code value bits among the bits and a quantity of the code value bits, and pseudo-random variable bits among the bits and a quantity of the pseudo-random variable bits;
    determining a combination quantity of each of the bits according to the quantity of data point locations in the bits and the quantity of data point locations, at which a code point exists, in the bits, wherein the combination quantity of each of the bits is the number of different combinations of data point locations and code points in the bit;
    acquiring a width, height and code numeric value of the anti-forgery image to be generated, and requesting a memory space for the anti-forgery image to be generated according to the width and height of the anti-forgery image to be generated, wherein a value range of the code numeric value is determined by the combination quantity of each of the bits and the quantity of code value bits among the bits;
    determining positions of the code points in the bits according to the code numeric value, the combination quantity of each of the bits, the quantity of the code value bits among the bits and the quantity of the pseudo-random variable bits among the bits;
    determining the image cell's initial coordinate in the anti-forgery image to be generated according to a rule for setting coordinates; and
    drawing the image cell in the memory space according to the image cell's initial coordinate in the anti-forgery image to be generated, wherein the drawn image cell forms the anti-forgery image.

2. The method of claim 1, wherein the step of determining positions of the code points in the bits according to the code numeric value, the combination quantity of each of the bits, the quantity of the code value bits among the bits and the quantity of the pseudo-random variable bits among the bits code point comprising:

calculating a value of each of the code value bit in the image cell according to the code numeric value, the combination quantity of each of the bits, and the quantity of the code value bits among the bits;

calculating a value range of each of the pseudo-random variables represented by the pseudo-random variable bit according to the combination quantity of each of the bits and the quantity of the pseudo-random variable bits among the bits;

determining a value template of the pseudo-random variables of the image cell according to the value range of the pseudo-random variables, so that a distance between two image cells including the pseudo-random variables of the same value is not less than a preset number of image cells;

generating randomly a numeric value within the value range of the pseudo-random variables as a pseudo-random variable represented by the pseudo-random variable bit in a first image cell; determining, according to the value template of the pseudo-random variables, pseudo-random variables represented by the pseudo-random variable bits in image cells other than the first image cell;

calculating the value of the pseudo-random variable bit in the image cell according to the combination quantity of the bits, the quantity of pseudo-random variable bits among the bits and the pseudo-random variables represented by the pseudo-random variable bits in the image cell; and determining the positions of the code points in the bits according to the value of the code value bit in the image cell, the value of pseudo-random variable bits and a mapping relation between the values of the bits and arrangement of the code points.

3. The method of claim 2, wherein the step of calculating a value of the code value bits in the image cell according to the code numeric, value, the combination quantity of the bits, and the quantity of the code value bits among the bits comprising:

calculating an initial value of the code value bit in the image cell according to the code numeric value, the combination quantity of the bits and the quantity of the code value bits among the bits; and encrypting the initial value of the code value bits with an encryption algorithm to obtain the value of code value bits.

4. The method of claim 2, wherein the step of calculating the value of the pseudo-random variable bits in the image cell according to the combination quantity of the bits, the quantity of pseudo-random variable bits among the bits and the pseudo-random variables represented by the pseudo-random variable bits in the image cell comprising:

generating a check value for the code numeric value with a check algorithm;

joining the check value and the pseudo-random variables represented by the pseudo-random variable bits in the image cell to obtain a joined value; and calculating the value of the pseudo-random variable bits in the image cell according to the combination quantity of the bits, the quantity of pseudo-random variable bits among the bits and the joined value.

5. The method of claim 1., wherein the step of determining the image cell's initial coordinate in the anti-forgery image to be generated according to a rule for setting coordinates comprising:

taking a coordinate of an origin of the anti-forgery image to be generated as an initial coordinate of a first image cell; and calculating initial coordinates, in the anti-forgery image to be generated, of image cells other than the first image cell according to surrounding image cells initial coordinates of which are known.

6. An apparatus for generating an anti-forgery image, comprising: at least one processor; and a memory storing instructions that when executed by the at least one processor cause the at least one processor to:

determine, according to a rule for setting bits, a quantity of bits in an image cell of an anti-forgery image to be generated, data point locations in the bits and a quantity of the data point locations, a quantity of data point locations, at which a code point exists, in the bits, code value bits among the bits and a quantity of the code value bits, and pseudo-random variable bits among the bits and a quantity of the pseudo-random variable bits;

determine a combination quantity of the bits according to the quantity of data point locations in the bits and the quantity of data point locations, at which a code point exists, in the bits, wherein the combination quantity of each of the bits is the number of different combinations of data point locations and code points in the bit;

acquire a width, height and code numeric value of the anti-forgery image to be generated, and request a memory space for the anti-forgery image to be generated according to the width and height of the anti-forgery image to be generated, wherein a value range of the code numeric value is determined by the combination quantity of the bits and the quantity of code bits among the bits;

determine positions of the code points in the bits according to the code numeric value, the combination quantity of the bits, the quantity of the code value bits among the bits and the quantity of the pseudo-random variable bits among the bits;

determine the image cell's initial coordinate in the anti-forgery image to be generated according to a rule for setting coordinates; and draw the image cell in the memory space according to the image cell's initial coordinate in the anti-forgery image to be generated, wherein the drawn image cell forms the anti-forgery image.

7. The apparatus of claim 6, wherein when determining positions of the code points in the bits according to the code numeric value, the combination quantity of the bits, the quantity of the code value bits among the bits and the quantity of the pseudo-random variable bits among the bits, the at least one processor is caused to;

calculate a value of the code value bits in the image cell according to the code numeric value, the combination quantity of the bits, and the quantity of the code value bits among the bits;

calculate a value range of pseudo-random variables represented by the pseudo-random variable bits according to the combination quantity of the bits and the quantity of the pseudo-random variable bits among the bits;

determine a value template of the pseudo-random variables of the image cell according to the value range of the pseudo-random variables, so that a distance between two image cells including pseudo-random variables of a same value is not less than a preset number of image cells;

randomly generate a numeric value within the value range of the pseudo-random variable as a pseudo-random variable represented by the pseudo-random variable bits in a first image cell; and determine, according to the value template of the pseudo-random variables, pseudo-random variables represented by the pseudo-random variable bits in image cells other than the first image cell;

calculate a value of the pseudo-random variable bits in the image cell according to the combination quantity of the bits, the quantity of pseudo-random variable bits among the bits and the pseudo-random variables represented by the pseudo-random variable bits in image cells; and determine the positions of the code points in the bits according to the value of the code value bits in the image cell, the value of pseudo-random variable bits and a mapping relation between the values of the bits and arrangement of the code points.

8. The apparatus of claim 7, wherein when calculating a value of the code value bits in the image cell according to the code numeric value, the combination quantity of the bits, and the quantity of the code value bits among the bits, the at least one processor is caused to:

calculate an initial value of the code value bits in the image cell according to the code numeric value, the combination quantity of the bits and the quantity of the code value bits among the bits; and encrypt the initial value of the code value bits with an encryption algorithm to obtain the value of the code value bits.

9. The apparatus of claim 7, wherein when calculating a value of the pseudo-random variable bits in the image cell according to the combination quantity of the bits, the quantity of pseudo-random variable bits among the bits and the pseudo-random variables represented by the pseudo-random variable bits in image cells, the at least one processor is caused to:

generate a check value for the code numeric value with a check algorithm;

join the check value and the pseudo-random variables represented by the pseudo-random variable bits in the image cell to obtain a joined value; and calculate the value of the pseudo-random variable bits in the image cell according to the combination quantity of the bits, the quantity of pseudo-random variable bits among the bits and the joined value.

10. The apparatus of claim 6, wherein when determining the image cell's initial coordinate in the anti-forgery image to be generated according to a rule for setting coordinates, the at least one processor is caused to:

take a coordinate of an origin of the anti-forgery image to be generated as an initial coordinate of a first image cell; and calculate initial coordinates, in the anti-forgery image to he generated, of image cells other than the first image cell according to surrounding image cells initial coordinates of which are known.

11. A non-transitory computer readable storage medium storing computer executable instructions, when executed by an electronic device, cause the electronic device to: determine, according to a rule for setting bits, a quantity of bits in an image cell of an anti-forgery image to be generated, data point locations in the bits and a quantity of the data point locations, a quantity of data point locations, at which a code point exists, in the bits, code value bits among the bits and a quantity of the code value bits, and pseudo-random variable bits among the bits and a quantity of the pseudo-random variable bits, wherein the combination quantity of each of the bits is the number of different combinations of data point locations and code points in the bit;

acquire a width, height and code numeric value of the anti-forgery image to be generated, and request a memory space for the anti-forgery image to he generated according to the width and height of the anti-forgery image to be generated, wherein a value range of the code numeric value is determined by the combination quantity of the bits and the quantity of code bits among the bits;

determine positions of the code points in the bits according to the code numeric value, the combination quantity of the bits, the quantity of the code value bits among the bits and the quantity of the pseudo-random variable bits among the bits;

determine the image cell's initial coordinate in the anti-forgery image to be generated according to a rule for setting coordinates; and draw the image cell in the memory space according to the image cell's initial coordinate in the anti-forgery image to be generated, wherein the drawn image cell forms the anti-forgery image.

12. The non-transitory computer readable storage medium of claim 11, wherein when determining positions of the code points in the bits according to the code numeric value, the combination quantity of the bits, the quantity of the code value bits among the bits and the quantity of the pseudo-random variable bits among the bits, the electronic device is caused to:

calculate a value of the code value bits in the image cell according to the code numeric value, the combination quantity of the bits, and the quantity of the code value bits among the bits;

calculate a value range of pseudo-random variables represented by the pseudo-random variable bits according to the combination quantity of the bits and the quantity of the pseudo-random variable bits among the bits;

determine a value template of the pseudo-random variables of the image cell according to the value range of the pseudo-random variables, so that a distance between two image cells including pseudo-random variables of a same value is not less than a preset number of image cells;

randomly generate a numeric value within the value range of the pseudo-random variable as a pseudo-random variable represented by the pseudo-random variable bits in a first image cell; and determine, according to the value template of the pseudo-random variables, pseudo-random variables represented by the pseudo-random variable bits in image cells other than the first image cell;

calculate a value of the pseudo-random variable bits in the image cell according to the combination quantity of the bits, the quantity of pseudo-random variable bits among the bits and the pseudo-random variables represented by the pseudo-random variable bits in image cells; and determine the positions of the code points in the bits according to the value of the code value bits in the image cell, the value of pseudo-random variable bits and a mapping relation between the values of the bits and arrangement of the code points.

13. The non-transitory computer readable storage medium of claim 12, wherein when calculating a value of the code value bits in the image cell according to the code numeric value, the combination quantity of the bits, and the quantity of the code value bits among the bits, the electronic device is caused to:

calculate an initial value of the code value bits in the image cell according to the code numeric value, the combination quantity of the, bits and the quantity of the code value bits among the bits; and encrypt the initial value of the code value bits with an encryption algorithm to obtain the value of the code value bits.

14. The non-transitory computer readable storage medium of claim 12, wherein when calculating a value of the pseudo-random variable bits in the image cell according to the combination quantity of the bits, the quantity of pseudorandom variable bits among the bits and the pseudo-random variables represented by the pseudo-random variable bits in image cells, the electronic device is caused to:

generate a check value for the code numeric value with a check algorithm;

join the check value and the pseudo-random variables represented by the pseudorandom variable bits in the image cell to obtain a joined value; and calculate the value of the pseudo-random variable bits in the image cell according to the combination quantity of the bits, the quantity of pseudo-random variable bits among the bits and the joined value.

15. The non-transitory computer readable storage medium of claim 11, wherein when determining the image cell's initial coordinate in the anti-forgery image to be generated according to a rule for setting coordinates, the electronic device is caused to:

take a coordinate of an origin of the anti-forgery image to be generated as an initial coordinate of a first image cell; and calculate initial coordinates, in the anti-forgery image to be generated, of image cells other than the first image cell according to surrounding image cells initial coordinates of which are known.

\* \* \* \* \*